Oct. 30, 1934.  J. A. STREUN  1,979,017

COTTON CLEANER

Filed Oct. 2, 1930

Inventor
John A. Streun

By Jesse R. Stone
Lester B. Clark
Attorneys

Patented Oct. 30, 1934

1,979,017

UNITED STATES PATENT OFFICE 1,979,017

COTTON CLEANER

John Arnold Streun, Sherman, Tex., assignor to Hardwicke-Etter Company, Sherman, Tex., a corporation of Texas Application October 2, 1930, Serial No. 485,866

6 Claims. (Cl. 19—37)

My invention relates to means for cleaning cotton and separating the same from hulls and chaff preparatory for the ginning operation.

In previous cleaners of this character it has been found advisable to provide means for moving the cotton along the saw cylinder, so that the lint may be effectively engaged by the saw teeth and removed from the hulls and other refuse. To move the cotton longitudinally of the saw cylinder conveyors of different construction have been devised. These conveyors add to the number of moving parts of the device and are an element of expense in the construction of the cleaner.

It is an object of my invention to provide a cleaner of the character shown in my prior application for patent filed August 15, 1930, Serial No. 475,575, in which the apparatus is arranged to feed the cotton to the saw cylinder and to direct the hulls, chaff, etc., toward the ends of the machine where it may be engaged by the usual conveyor and discharged from the center of the machine.

I contemplate moving the cotton and hulls toward the ends of the saw cylinder without the necessity of the usual conveyor.

The device includes the combination of deflecting vanes or baffles which co-operate with a conveyor roll to cause the movement of the cotton and hulls from the ends of the saw cylinder toward the middle or from the middle toward the ends as may be desired.

Figure 1:
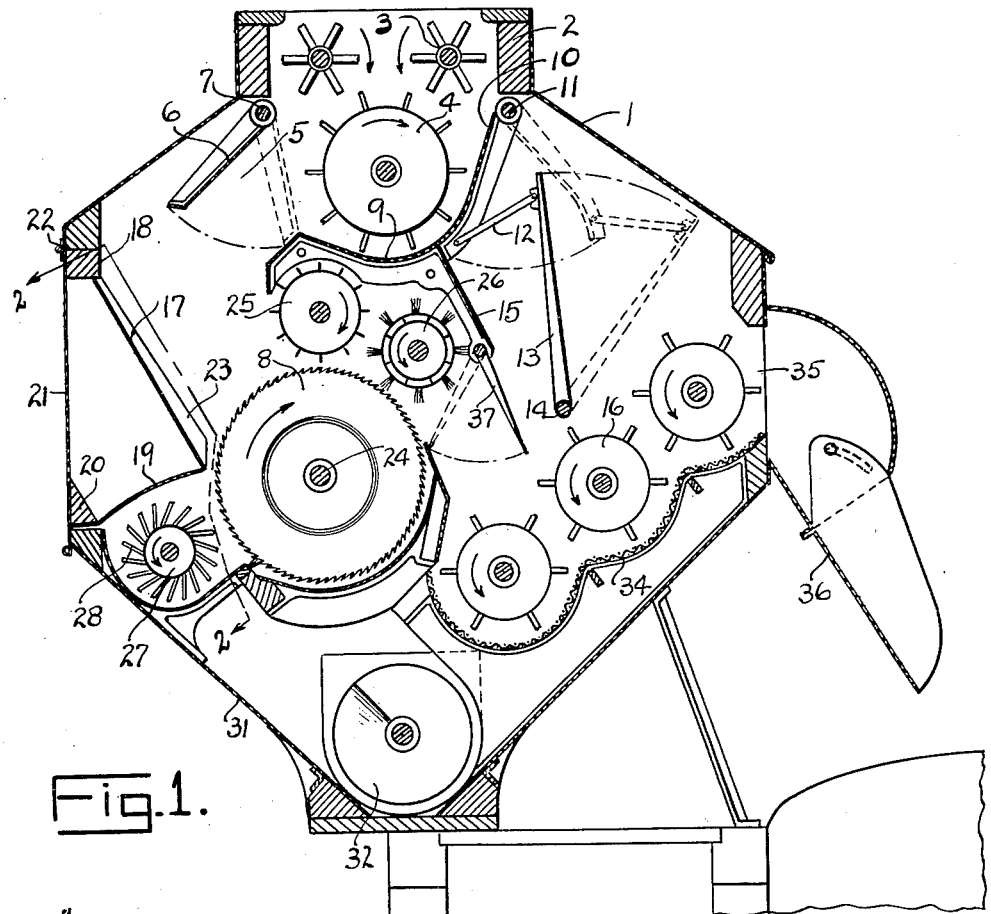

In the drawing herewith illustrating one embodiment of my invention, Fig. 1 is a side view in vertical section adjacent the side of the housing showing the position and arrangement of the parts of my device.

Figure 2:
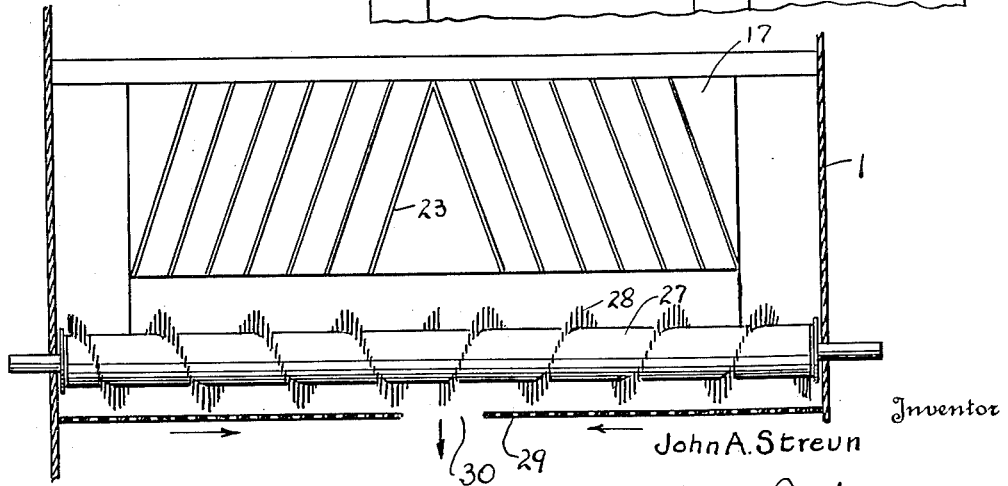

Fig. 2 is a transverse section on the plane 2—2 of Fig. 1.

The device in connection with which I have shown my invention applied is mostly shown in my prior application above referred to and the exact construction of the complete device may be taken as largely illustrative, it being understood that my invention may be employed with any other construction of cleaner of this general character.

In the drawing I have shown a housing 1 so arranged as to support the rolls, cylinders and other moving parts on the side walls thereof. At the upper end of said housing is a feeding element indicated generally at 2. This feeding element comprises a hopper within which are journaled for rotation two feeding rolls, 3, adapted to rotate to move the cotton downwardly against a picker roll 4, which agitates the cotton and distributes it uniformly so that it may be discharged from the hopper through an opening 5 to the cleaner. This construction is old in the art and need not be further described.

I have shown a moving door or valve 6, which is pivoted upon a shaft 7 in the walls of the housing and adapted to be moved to and from closed position as indicated in the drawing. It may be understood that this valve when closed will shut off the passage of cotton to the saw cylinder.

The lower side of the hopper is made up of a wall 9, which may be of sheet metal or other preferred construction, said wall being formed with a door 10 therein opposite the door 6, which may be opened to allow the discharge of the cotton away from the saw cylinder 8. This door is pivoted at 11 and is connected at its lower end by a link 12 to an arm 13, fixed to a shaft 14, mounted in the wall of the housing and adapted to swing, as shown by the dotted lines, into open position to allow the discharge of the cotton over a chute 15 to cleaning rolls 16.

When the cotton is discharged toward the saw cylinder 8 it may be received upon an inclined baffle or chute 17 at the forward side of the housing. This chute is preferably of sheet metal construction, the upper end of which is connected at 18 to the frame of the housing. The wall is inclined downwardly and inwardly to a point closely adjacent the forward side of the saw cylinder. It is supported in that position by a lower wall 19 connected to the cross piece 20 on the frame. The cross piece 20 is connected to the outer wall 21, which may be hinged at 22 so as to swing outwardly to expose the saw cylinder when desired. The inner face of the chute 17 is provided with vanes or blades 23, which are also preferably of sheet metal or similar thin construction, narrower in width at the upper end and widening slightly toward the lower end as seen in Fig. 1. These blades are also inclined from the center toward each end of the deflector as will be understood from Fig. 2.

The saw cylinder 8 is mounted upon the shaft 24 in the usual manner, having a knocker roll 25 above the same and a brush roll 26 above and to the rear of the said saw.

In front of the saw cylinder and slightly below the same is a conveyor roll 27. This roll is provided with a spirally arranged row of pins 28, which, as shown in Fig. 2, are arranged so that the rotation of said roll in a counter-clockwise direction, as seen in Fig. 1, will convey the hulls and chaff falling thereon from the ends toward the center. Immediately below the conveyor roll is a trough 29 having an opening at 30 to allow the chaff to be distributed downwardly along an inclined wall 31 to the screw conveyor 32, by which it is discharged from the housing.

To the rear of the saw cylinder are the agitator rolls 16 previously referred to. I have shown three such rolls arranged in stages upwardly along an inclined foraminated screen 34 so that the cotton may be engaged by said rolls and moved upwardly along said screen and discharged through the outlet port 35 to a discharge chute 36.

I have shown a gate or valve 37 pivoted in the frame of the housing and adapted to be moved to close the space between the cleaning cylinders 16 and the saw cylinder 8.

In the operation of my device the cotton will be discharged into the hopper 2 and fed therefrom by the feeding elements through the opening 5 to the saw cylinder. The cotton with the chaff and hulls thereon will be deflected from the center toward the ends of the saw cylinder. The lint will be engaged by the teeth of the saws and carried upwardly around the same to be removed therefrom by the brush roll 26. Hulls or chaff engaged with the lint will be removed therefrom by the teeth upon the knocker roll 25 and thrown backwardly against the deflecting blades 23. As these blades are inclined toward the ends of the saw cylinder repeated movement of the hulls against the blades will move them toward the ends of the saw cylinder and they will be discharged downwardly onto the conveyor roll 27 and be moved thereby to the center where they will be discharged through the opening 30. Said hulls in their movement by the conveyor along the saw cylinder will be subjected again to the action of the saw teeth to remove any lint which may be left with the hulls and chaff.

As the cotton is discharged by the brush roll to the cleaning cylinders 16 the cotton will be moved over the foraminated screen 34 and the dust and dirt will drop through and be engaged by the conveyor roll 32 and discharged from the housing. Cotton will be moved to the outlet where it will be received upon the usual conveyor not shown.

If the cotton is sufficiently clean it need not be passed over the saw cylinder but the door 6 may be closed and the door 10 opened to allow the cotton to be discharged directly to the cleaning cylinders 16. In this case the door 37 will also be closed and the cotton will be subjected to a minimum cleaning operation as will be obvious.

By the use of my improved deflector 17 I am enabled to move the cotton and hulls along the upper side of the saw cylinder without the necessity of separate moving parts. This is found to be superior in its operation to the usual conveying apparatus and is simple in construction and economical in use.

Having thus described my invention what I claim as new is:—

1. In a machine of the character described the combination including a housing, a saw cylinder rotatable therein, means to feed cotton to said cylinder, and stationary deflecting means constituting a chute leading to said cylinder, ribs on said deflecting means to deflect the cotton and hulls laterally along said cylinder, and a conveyor below said deflecting means to move said cotton and hulls along said cylinder and discharge the same away from said cylinder.

2. In a cotton machine a housing, a saw cylinder rotatable therein, means to feed cotton thereto, a baffle adjacent said cylinder inclined downwardly to conduct the cotton toward said cylinder and means thereon to deflect the cotton laterally along said cylinder, said deflecting means including inwardly projecting blades on said baffle and a conveyor roll below said baffle to move said cotton from the ends of said cylinder toward the middle.

3. In a cotton machine a housing, a saw cylinder rotatable therein, means to feed cotton thereto, a baffle adjacent said cylinder inclined downwardly to conduct the cotton toward said cylinder and means thereon to deflect the cotton laterally along said cylinder, said deflecting means including inwardly projecting blades inclined laterally at their lower ends from the longitudinal center of said baffle so as to deflect said cotton toward the ends of said cylinder, and a rotating conveyor roll below said baffle to carry said cotton from the ends toward the middle of said cylinder.

4. In a cotton machine, a housing, a saw cylinder therein, a feeding means above said cylinder, a brush roll adjacent said cylinder, a baffle on said housing inclined inwardly at its lower end toward said cylinder, means on said baffle to deflect cotton and hulls laterally along said cylinder, and means to throw said cotton and hulls toward said baffle.

5. In a cotton cleaning and extracting machine having a rotary saw cylinder and a rotary stripper cylinder coacting therewith, a stationary conveyor member adapted to receive cotton to be cleaned and also adapted to receive substance removed from the saw cylinder by the stripping cylinder, said conveyor member being formed with guiding means inclined downwardly toward the periphery of the saw cylinder for delivering substance thereto, said guiding means also being directed outwardly toward the sides of the machine, whereby substance will be gradually moved laterally as the lint is removed, and will finally be discharged at the outer ends of said conveyor.

6. In a cotton cleaning and extracting machine having a rotary saw cylinder and a rotary stripping member adapted to remove coarse substance therefrom, a conveying means comprising a plate extending beneath said stripping member and inclined downwardly toward the saw cylinder for delivering substance thereto by gravity and for receiving substance removed by the stripping member and returning it toward said saw cylinder, said conveying means also including means for directing the substance laterally toward the outer ends of the cylinder, whereby the foreign material in the cotton will be gradually worked out of range of the cylinder as the substance is repeatedly engaged thereby and removed by the stripping member.

JOHN ARNOLD STREUN.